United States Patent (10) Patent No.: US 9,396,400 B1
Teichman et al. (45) Date of Patent: Jul. 19, 2016

(54) COMPUTER-VISION BASED SECURITY SYSTEM USING A DEPTH CAMERA (71) Applicant: Snitch, Inc., Palo Alto, CA (US)

(72) Inventors: Alexander William Teichman, Palo Alto, CA (US); Hendrik Dahlkamp, Palo Alto, CA (US)

( * ) Notice: Subject to any disclaimer, the term of this patent is extended or adjusted under 35 U.S.C. 154(b) by 4 days.

(21) Appl. No.: 14/813,907

(22) Filed: Jul. 30, 2015

(51) Int. Cl.
*G06K 9/00* (2006.01)
*G06T 7/00* (2006.01)
*G06K 9/62* (2006.01)

(52) U.S. Cl.
CPC .......... *G06K 9/00771* (2013.01); *G06K 9/6218* (2013.01); *G06T 7/0081* (2013.01)

(58) Field of Classification Search
CPC ........... G06T 2207/10028; G06T 2207/20144; G06T 7/0081; G06K 9/00771; G06K 9/6218
See application file for complete search history.

(56) References Cited

U.S. PATENT DOCUMENTS

| 2004/0153671 | A1* | 8/2004 | Schuyler | G07C 9/00111 726/9 |
| 2011/0142289 | A1* | 6/2011 | Barenbrug | G06T 7/0081 382/107 |
| 2012/0087573 | A1* | 4/2012 | Sharma | G06K 9/00771 382/154 |
| 2013/0258138 | A1* | 10/2013 | Ma | H04N 5/272 348/239 |
| 2014/0049614 | A1* | 2/2014 | Yamada | H04N 5/2226 348/46 |
| 2014/0056471 | A1* | 2/2014 | Gu | G06K 9/00208 382/103 |
| 2014/0093159 | A1* | 4/2014 | Nguyen | G06T 5/002 382/154 |
| 2015/0063468 | A1* | 3/2015 | Yamamoto | H04N 19/597 375/240.26 |
| 2015/0179147 | A1* | 6/2015 | Rezaiifar | G03B 21/142 345/625 |

OTHER PUBLICATIONS

Chad Aeschliman, Johnny Park, and Avinash Kak; "A probabilistic framework for joint segmentation and tracking"; Computer Vision and Pattern Recognition (CVPR), 2010 (8 pages).
M. Andriluka, S. Roth, and B. Schiele; "People-tracking-by-detection and people-detection-by-tracking"; Computer Vision and Pattern Recognition (CVPR), IEEE, 2008(8 pages).
Xue Bai, Jue Wang, David Simons, and Guillermo Sapiro; "Video snapcut: robust video object cutout using localized classifiers"; SIGGRAPH, 2009 (11 pages).
Charles Bibby and Ian Reid; "Real-time tracking of multiple occluding objects using level sets"; IEEE, 2010 (8 pages).
Helmut Grabner, Michael Grabner, and Horst Bischof; "Real-time tracking via on-line boosting"; British Machine Vision Conference (BMVC), 2006 (10 pages).
Stefan Hinterstoisser, Stefan Holzer, Cedric Cagniart, Slobodan Ilic, Kurt Konolige, Nassir Navab, and Vincent Lepetit; "Multimodal templates for real-time detection of texture-less objects in heavily cluttered scenes"; ICCV, 2011 (8 pages).

(Continued)

*Primary Examiner* — Vu Le
*Assistant Examiner* — Kenny Cese
(74) *Attorney, Agent, or Firm* — Osha Liang LLP (57) ABSTRACT

A method for securing an environment. The method includes obtaining a two-dimensional (2D) representation of a three-dimensional (3D) environment. The 2D representation includes a 2D frame of pixels encoding depth values of the 3D environment. The method further includes identifying a set of foreground pixels in the 2D representation, defining a foreground object based on the set of foreground pixels. The method also includes classifying the foreground object, and taking an action based on the classification of the foreground object.

12 Claims, 6 Drawing Sheets

(56) References Cited

OTHER PUBLICATIONS

Zdenek Kalal, Jiri Matas, and Krystian Mikolajczyk. "P-N learning: Bootstrapping binary classifiers by structural constraints"; Computer Vision and Pattern Recognition (CVPR), 2010 (8 pages).

Junseok Kwon and Kyoung Mu Lee; "Tracking of a non-rigid object via patch-based dynamic appearance modeling and adaptive basin hopping monte carlo sampling"; Computer Vision and Pattern Recognition (CVPR), 2009 (8 pages).

Victor A. Prisacariu and Ian D. Reid; "PWP3D: Real-time segmentation and tracking of 3D objects"; British Machine Vision Conference (BMVC), 2009 (10 pages).

Xiaofeng Ren and Jitendra Malik; "Tracking as repeated figure/ground segmentation"; Computer Vision and Pattern Recognition (CVPR), 2007 (8 pages).

Dirk Schulz, Wolfram Burgard, Dieter Fox, and Armin B. Cremers; "People tracking with mobile robots using sample-based joint probabilistic data association filters"; The International Journal of Robotics Research, 22(2):99-116, Feb. 2003 (19 pages).

Severin Stalder, Helmut Grabner, and Luc Van Gool; "Beyond semi-supervised tracking: Tracking should be as simple as detection, but not simpler than recognition"; International Conference on Computer Vision Workshop on On-line Learning for Computer Vision, Sep. 2009; URL http://ieeexplore.ieee.org/lpdocs/epic03/wrapper.htm?arnumber=5457445 (8 pages).

A. Teichman, Dissertation, "User-Trainable Object Recognition Systems Via Group Induction"; Submitted to the Department of Computer Science and the Committee on Graduate Studies of Stanford University Jun. 2014 (101 pages).

* cited by examiner

FIG. 6 the COMPUTER-VISION BASED SECURITY SYSTEM USING A DEPTH CAMERA

BACKGROUND

Motion detection may be used by security systems for monitoring an environment. Motion detectors may respond to motion affiliated with threats, e.g., an intruder entering the monitored environment, but also to motion affiliated with non-threat events, e.g., a pet entering the monitored environment.

SUMMARY

In general, in one aspect, the invention relates to a method for securing an environment. The method includes obtaining a two-dimensional (2D) representation of a three-dimensional (3D) environment. The 2D representation includes a 2D frame of pixels encoding depth values of the 3D environment. The method further includes identifying a set of foreground pixels in the 2D representation, defining a foreground object based on the set of foreground pixels, assigning pixels of the 2D representation that are not associated with the foreground object to a background, eliminating the background from the 2D representation to obtain an updated 2D representation, and sending the updated 2D representation to a remote processing service.

In general, in one aspect, the invention relates to a method for securing an environment. The method includes receiving a two-dimensional (2D) representation of a three-dimensional (3D) environment. The 2D representation is a 2D frame of pixels encoding depth values of the 3D environment, and includes a foreground object. A background has been removed from the 2D representation. The method further includes classifying the foreground object, and taking an action based on the classification of the foreground object.

In general, in one aspect, the invention relates to a method for securing an environment. The method comprises receiving a two-dimensional (2D) representation of a three-dimensional (3D) environment. The 2D representation is a 2D frame of pixels encoding depth values of the 3D environment. The method further includes identifying a set of foreground pixels in the 2D representation, defining a foreground object based on the set of foreground pixels, classifying the foreground object, and taking an action based on the classification of the foreground object.

In general, in one aspect, the invention relates to a non-transitory computer readable medium storing instructions for securing an environment. The instructions enable a system to obtain a two-dimensional (2D) representation of a three-dimensional (3D) environment. The 2D representation includes a 2D frame of pixels encoding depth values of the 3D environment. The instructions further enable the system to identify a set of foreground pixels in the 2D representation, define a foreground object based on the set of foreground pixels, assign pixels of the 2D representation that are not associated with the foreground object to a background, eliminate the background from the 2D representation to obtain an updated 2D representation, and send the updated 2D representation to a remote processing service.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a monitoring system used for securing an environment. More specifically, one or more embodiments of the invention include a monitoring system that performs methods for detecting object movement in a monitored environment, isolating the moving objects from the surrounding environment, and classifying the moving objects. Based on the classification of the moving objects by a classification algorithm, the moving objects may be determined to be either threats, harmless, or unknown. If an object is determined to be a threat, the monitoring system may take appropriate defensive action, e.g. the police may be called, the owner of the premises equipped with the monitoring system may be notified, etc. If the object is determined to be harmless, no action may be taken. If the object cannot be identified, the monitoring system may request resolution by a third party, e.g., a human operator, in order to classify the object. In one embodiment of the invention, the classification performed by the human operator may be used to update the classification algorithm, thus enabling the monitoring system to successfully classify the object in the future.

Figure 1:
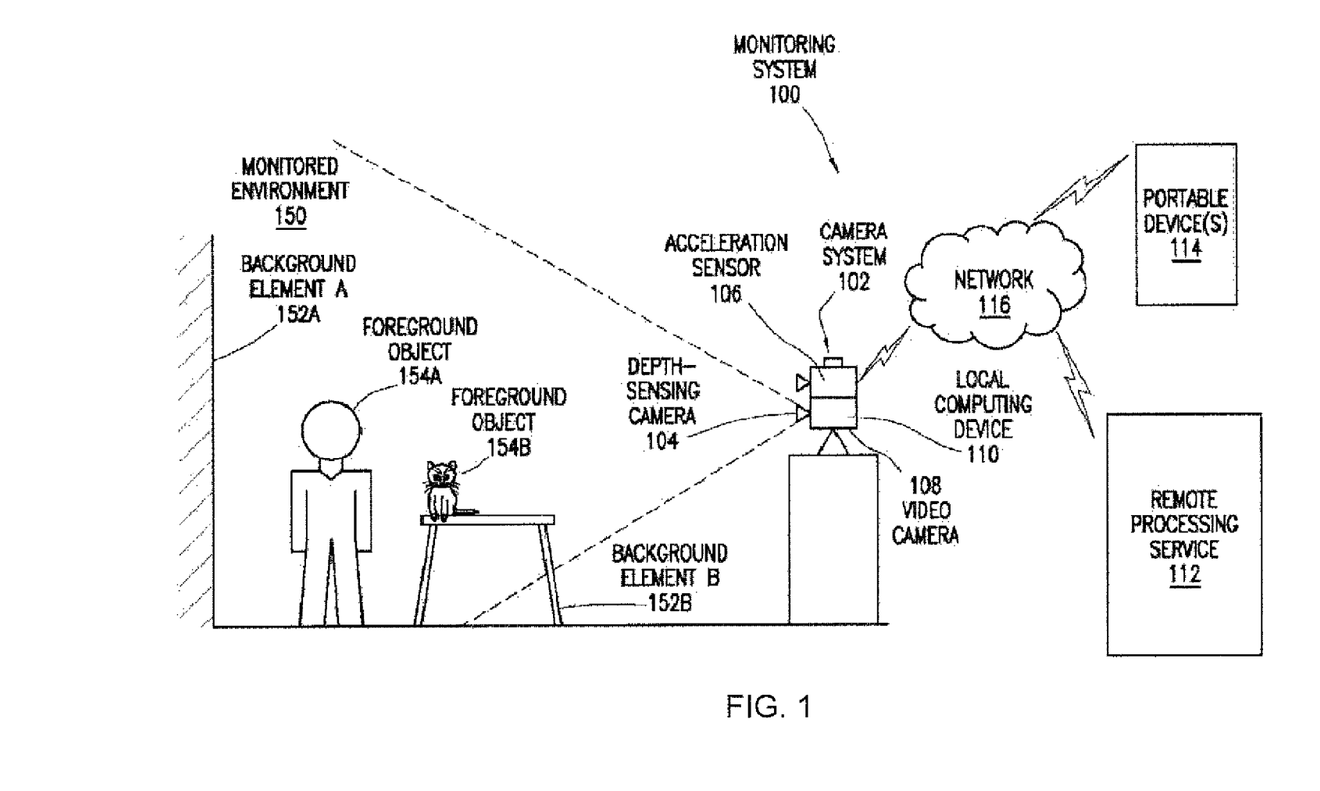
FIG. 1 shows a system in accordance with one or more embodiments of the invention.

FIG. 1 shows a monitoring system (100) used for the surveillance of an environment (monitored environment (150)), in accordance with one or more embodiments of the invention. The monitored environment may be a three-dimensional space that is within the field of view of a camera system (102). The monitored environment (150) may be, for example, an indoor environment, such as a living room or an office, or it may be an outdoor environment such as a backyard. The monitored environment (150) may include background elements (e.g., 152A, 152B) and foreground objects (e.g., 154A, 154B). Background elements may be actual backgrounds, i.e., a wall or walls of a room. In one embodiment of the invention, the monitoring system (100) may further classify other objects, e.g., stationary objects such as a table (background element B (152B)) as background elements. In one embodiment of the invention, the monitoring system (100) may classify other objects, e.g., moving objects such as a human or a pet, as foreground objects (154A, 154B). The monitoring system (100) may further classify detected foreground objects (154A, 154B) as threats, for example, if the monitoring system (100) determines that a person (154A) detected in the monitored environment (150) is an intruder, or as harmless, for example, if the monitoring system (100) determines that the person (154A) detected in the monitored environment (150) is the owner of the monitored premises, or if the classified object is a pet (154B). The details of the background versus foreground classification are described below, for example, with reference to FIGS. 2-6. In one embodiment of the invention, the monitoring system (100) includes a camera system (102) and a remote computing device (112). In one embodiment of the invention, the monitoring system further includes one or more portable devices (114). Each of these components is described below.

In one or more embodiments of the invention, the monitoring system (100) includes a camera system (102). The camera system may include a depth sensing camera (104) and a local computing device (110), and may further include an acceleration sensor (106) and/or a video camera (108). The camera system (102) may be a portable unit that may be positioned such that the field of view of the depth-sensing camera (104) covers an area of interest in the environment to be monitored. The camera system (102) may be placed, for example, on a shelf in a corner of a room to be monitored, thereby enabling the camera to monitor the space between the camera system (102) and a back wall of the room. During the initial setup of the monitoring system (100), a live view of the image of the camera system (102) (e.g., the image of the video camera 108) may be displayed, thereby facilitating the positioning of the camera system. The live view may include a visualization of the range of the depth sensing camera (104), e.g., the parts of the image that are within range of the depth sensing camera (104) may be displayed in color, whereas the parts of the image that are outside the range of the depth sensing camera (104) may be displayed in black and white. Further, a bold red curve (or any other type of salient marking) may be used for separating parts that are within the range from parts that are outside the range of the depth sensing camera (104). Other locations of the camera system may be used without departing from the invention.

In one embodiment of the invention, the depth-sensing camera (104) is a camera capable of reporting multiple depth values from the monitored environment (150). For example, the depth-sensing camera (104) may provide depth measurements for a set of 320×240 pixels (Quarter Video Graphics Array (QVGA) resolution) at a temporal resolution of 30 frames per second (fps). The depth-sensing camera (104) may be based on scanner-based or scannerless depth measurement techniques such as, for example, LIDAR, using time-of-flight measurements to determine a distance to an object in the field of view of the depth-sensing camera (104). In one embodiment of the invention, the depth-sensing camera (104) may further provide a 2D grayscale image, in addition to the depth-measurements, thereby providing a complete 3D grayscale description of the monitored environment (150). In one embodiment of the invention, the volume of the monitored environment (150) is defined by the specifications of the depth-sensing camera (104). The depth-sensing camera (104) may, for example, have a set field of view, a limited minimum and/or maximum depth tracking distance, etc. The volume of the monitored environment (150) may be adjusted, for example, by parameterizing the depth-sensing camera, by selecting an appropriate depth-sensor, by adjust the camera optics of the depth-sensing camera (104), by moving the depth-sensing camera (104), etc. Those skilled in the art will appreciate that the invention is not limited to the aforementioned depth-sensing technology, temporal, and/or spatial resolutions. For example, stereo cameras may be used rather than time-of-flight-based cameras.

Continuning with the discussion of FIG. 1, the acceleration sensor (106) may be rigidly connected to the other components of the camera system (102), i.e., to the depth sensing camera (104) and to the color camera (108). In one embodiment of the invention, the acceleration sensor (106) is a multi-axis accelerometer that may enable the camera system (102) to detect movement of the camera system and to determine the camera system's orientation (i.e., to distinguish top and bottom of the field of view, whether and in what direction the camera is tilted, etc., based on gravity). The accelerometer may be based on piezoresistive, piezocapacitive, or other measurement methods suitable for converting a mechanical acceleration into an electrical signal.

The video camera (108) may be capable of continuously capturing a two-dimensional video of the environment (150). The video camera may be rigidly connected to the other components of the camera system (102). The field of view and the orientation of the video camera may be selected to cover a portion of the monitored environment (150) similar (or substantially similar) to the portion of the monitored environment captured by the depth sensing camera. The video camera may use, for example, an RGB or CMYG color CCD or CMOS sensor with a spatial resolution of for example, 320×240 pixels, and a temporal resolution of 30 frames per second (fps). Those skilled in the art will appreciate that the invention is not limited to the aforementioned image sensor technologies, temporal, and/or spatial resolutions. Further, a video camera's frame rates may vary, for example, depending on the lighting situation in the monitored environment.

In one embodiment of the invention, the camera system (102) includes a local computing device (110). Any combination of mobile, desktop, server, embedded, or other types of hardware may be used to implement the local computing device. For example, the local computing device (110) may be a system on a chip (SOC), i.e. an integrated circuit (IC) that integrates all components of the local computing device (110) into a single chip. The SOC may include one or more processor cores, associated memory (e.g., random access memory (RAM), cache memory, flash memory, etc.), a network interface (e.g., a local area network (LAN), a wide area network (WAN) such as the Internet, mobile network, or any other type of network) via a network interface connection (not shown), and interfaces to storage devices, input and output devices, etc. The local computing device (110) may further include one or more storage device(s) (e.g., a hard disk, an optical drive such as a compact disk (CD) drive or digital versatile disk (DVD) drive, a flash memory stick, etc.), and numerous other elements and functionalities. In one embodiment of the invention, the computing device includes an operating system (e.g., Linux) that may include functionality to execute the methods further described below. Those skilled in the art will appreciate that the invention is not limited to the aforementioned configuration of the local computing device (110). In one embodiment of the invention, the local computing device (110) may be integrated with the depth sensing camera (104), the color camera (108), and/or the acceleration sensor (106). Alternatively, the local computing device (110) may be detached from the depth sensing camera (104), the acceleration sensor (106) and/or the color camera (108), and may be using wired and/or wireless connections to interface with the local computing device (110). In one embodiment of the invention, the local computing device (110) executes methods that include functionality to implement at least portions of the various methods described below (see e.g., FIGS. 2-6). The methods performed by the local computing device (110) may include, but are not limited to, functionality to identify foreground objects from movement detected in the depth data provided by the depth-sensing camera (104), and to send the depth data of the foreground objects to the remote processing service (112).

Continuing with the discussion of FIG. 1, in one or more embodiments of the invention, the monitoring system (100) includes a remote processing service (112). In one embodiment of the invention, the remote processing service (112) is any combination of hardware and software that includes functionality to serve one or more camera systems (102). More specifically, the remote processing service (112) may include one or more servers (each including at least a processor, memory, persistent storage, and a communication interface) executing one or more applications (not shown) that include functionality to implement various methods described below with reference to FIGS. 2-6). The services provided by the remote processing service (112) may include, but are not limited to, functionality to: receive and archive streamed video, identify and track foreground objects (154) from the depth data provided by a camera system (102), and classify identified foreground objects (154). The services provide by the remote processing service may further include additional functionalities to handle foreground objects (154) classified as threats, and to learn the classification of unknown foreground objects (154). In one embodiment of the invention, the remote processing service (112) may request the assistance of a human operator(s) in order to classify an unknown foreground object, or when a performed classification is not completed with high certainty.

In one or more embodiment of the invention, the monitoring system (100) includes one or more portable devices (114). A portable device (114) may be a device (e.g., a laptop, smart phone, tablet, etc.) capable of receiving notifications from the remote processing service (112). A notification may be, for example, a text message, a phone call, a push notification, etc. In one embodiment of the invention, the portable device (114) may include functionality to enable a user of the portable device (114) to interact with the camera system (102) and/or the remote processing service (112). The user may, for example, receive video streams from the camera system, configure, activate or deactivate the camera system, etc.

The components of the monitoring system (100), i.e., the camera system(s) (102), the remote processing service (112) and the portable device(s) (114) may communicate using any combination of wired and/or wireless communication protocols. In one embodiment of the invention, the camera system(s) (102), the remote processing service (112) and the portable device(s) (114) communicate via a wide area network (e.g., over the Internet), and/or a local area network (e.g., an enterprise or home network). The communication between the components of the monitoring system (100) may include any combination of secured (e.g., encrypted) and non-secure (e.g., un-encrypted) communication. The manner in which the components of the monitoring system (100) communicate may vary based on the implementation of the invention.

One skilled in the art will recognize that the monitoring system is not limited to the components shown in FIG. 1. For example, the depth-sensing camera may be based on different underlying depth-sensing technologies, and/or the camera system may include additional components not shown in FIG. 1, e.g. infrared illuminators providing night vision capability, ambient light sensors that may be used by the camera system to detect and accommodate changing lighting situations, etc. Further, a monitoring system may include any number of camera systems, any number of remote processing services, and/or any number of portable devices. In addition, the monitoring system may be used to monitor a variety environments, including various indoor and outdoor scenarios.

FIGS. 2-6 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-6 may be performed in parallel with any other steps shown in FIGS. 2-6 without departing from the invention.

Figure 2:
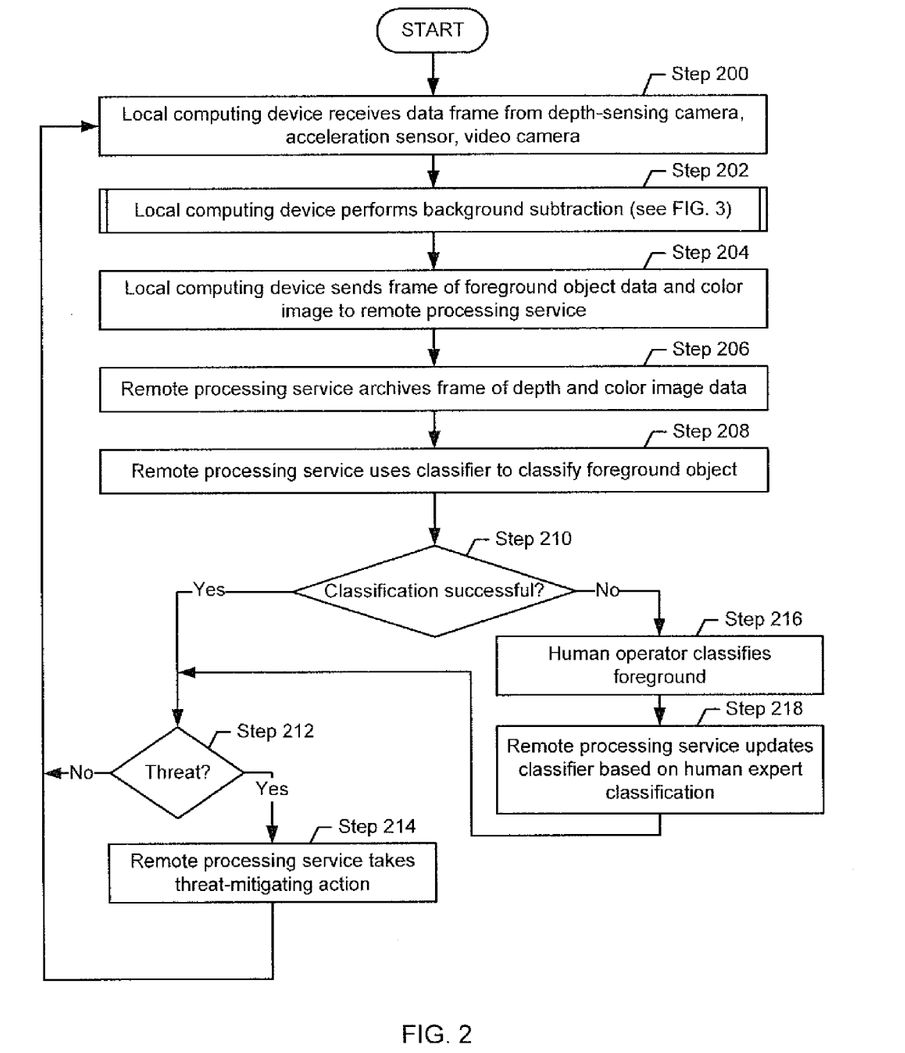
FIG. 2 shows a flowchart in accordance with one or more embodiments of the invention.

FIG. 2 shows a method for securing an environment. The method may include monitoring an environment, classifying objects detected in the environment, and taking appropriate actions, depending on the object classification. In one embodiment of the invention, Steps 200-218 may be repeatedly executed to continuously secure the monitored environment once the camera system is active. In one embodiment of the invention, certain steps of the method described in FIG. 2 and subsequent FIGS. 3-6 may be executed, selectively executed, or skipped, depending on the functionalities of the monitoring system that are activated, as further described below, with reference to FIGS. 2-6. For example, only the steps necessary to archive recordings from the depth-sensing camera and from the video camera may be performed when the system is disarmed. The monitoring system may be armed/disarmed, for example, based on the time of day and/or based on whether the system determines that the owner of the monitored premises is at home. The presence of an owner (or another authorized person) may be detected, for example, based on the current GPS coordinates of the user's (or authorized person's) portable device, or interactively, for example by the monitoring system requesting identification and a passphrase when a person is detected in the monitored environment. Rather than immediately triggering an alarm, the system may void the alarm and/or disarm the monitoring system if the person in the monitored environment identifies herself and provides the correct passphrase. If no passphrase or an incorrect passphrase is provided, the system may escalate its response, for example, by repeating the request to provide the passphrase, providing a warning, and eventually triggering an alarm. The monitoring system may further arm/disarm on its own based on activity in the monitored environment. The monitoring system may, for example, arm automatically in the evening past a typical bedtime and when no movement has been detected during a certain amount of time. The monitoring system may, over time, learn the schedule of the owner(s) and may automatically determine a typical time for arming the monitoring system. Further, to ensure privacy, the camera system may not record any images when the owner of the monitored premises is at home.

The execution of the methods described below may be distributed between the local computing device of the camera system and the remote processing service. Even though a specific distribution is described below, this distribution may be changed without departing from the scope of the invention. For example, steps described below as being executed by the remote processing service may instead be executed by the local computing device and vice versa.

Before the execution of Steps 200-218, the camera system may start, for example, after connecting power to the camera system, after a user activates the camera system, etc. During the startup of the camera system, components of the camera system may be initialized. The initialization may include, for example, a self-test and/or calibration of the depth-sensing camera, and the booting of the local computing device, including loading and initializing software modules that may perform at least some of the methods of Steps 200-218. The initialization may further include determining, based on acceleration sensor data, the orientation of the camera system, in order to enable the camera system to correctly interpret depth data during the processing performed in Steps 200-218. During the startup of the camera system, the camera system may further establish a connection to the remote processing service. Subsequently, the periodic execution of Steps 200-218 may begin. In one embodiment of the invention, Steps 200-218 may be performed whenever a frame is received from the depth-sensing camera. For example, if the depth-sensing camera provides frames at 30 frames per second (fps), Steps 200-218 may be performed 30 times per second. Alternatively frames may be skipped, i.e., not each frame provided by the depth-sensing camera may be processed.

In Step 200, the local computing receives data from the depth-sensing camera, the acceleration sensor, and the video camera. More specifically, in one embodiment of the invention, the depth-sensing camera sends a frame of depth data to the local computing device. In one embodiment of the invention, the depth-sensing camera sends frames of depth data to the local computing device at regular intervals, for example, at 30 fps. A frame of depth data may include, for example, a rectangular grid of 320×240 depth measurement pixels obtained by the depth-sensing camera. Each depth measurement for a pixel may represent a distance from the camera to a particular point in the monitored environment. A depth measurement may be encoded using, for example, a 16-bit unsigned integer value. In one embodiment of the invention, a brightness value is further obtained along with the depth measurement for each pixel. Accordingly, the depth sensing camera may provide a grayscale image of the monitored environment, where each pixel of the grayscale image includes a depth measurement, thereby establishing a 3D representation of the environment.

Further, the local computing device may obtain an acceleration measurement or a set of acceleration measurements from the acceleration sensor and the video camera may send a frame of color video data to the local computing device. In one embodiment of the invention, the field of view of the video camera is similar to the field of view of the depth-sensing camera. Accordingly the combination of color video image and depth data may enable the reconstruction of a color 3D model of the monitored environment. In one embodiment of the invention, temporal synchronization of the signals from the depth-sensing camera and the video camera may be maintained by the local computing device, even if the depth-sensing camera and the video camera operate at different frame rates.

In Step 202, the local computing device performs background subtraction based on the data received in Step 200, i.e., the local computing device identifies foreground objects, isolates the identified foreground objects, classifies non-foreground object related image data as background, and eliminates the background from the frame of depth data by setting all background pixels to a constant background depth value. The details of Step 202 are described in FIG. 3.

In Step 204, the local computing device sends the frame of depth data, from which the background was subtracted in Step 202, to the remote processing service. The local computing device may further send the color image and acceleration sensor data received in Step 200 to the remote processing service. The background, having been eliminated in Step 202, may be sent as a mask of constant values, i.e., only regions of the frame that contain foreground objects may have actual depth measurements, thus reducing the data volume of the frame. In one embodiment of the invention, the depth data sent to the remote processing service are spatially downsampled. The original depth measurements, provided by the depth-sensing camera may be, for example, 16 bit unsigned integer values that may be downsampled to 8 bit unsigned integer values. In order to minimize the loss of spatial resolution, a workspace specific scaling may be performed prior to the downsampling. For example, if the tracked workspace ranges from 1 meter away from the camera system to 10 meters away from the camera system, the 8 bit unsigned integer value "0" may be set to correspond to a distance of 1 m, whereas the 8 bit unsigned integer value "255" may be set to correspond to a distance of 10 m, thereby having the 8 bit unsigned integer value represent only the range from 1 m to 10 m. In one embodiment of the invention, the 8-bit resolution depth data may be sent as a video stream, i.e. each frame of depth data may be sent as a frame of the video stream. Standard video compression algorithms (e.g., MPEG-1, 2, or 4, etc.) may be used to further reduce the data volume of the depth data sent as a video stream. The local computing device may further send the color image from the video camera and acceleration sensor data, received in Step 202, to the remote processing service.

In Step 206, the remote processing service archives the incoming streams of depth and color image data. The remote processing service may, for example, write the streams of video data to a hard disk drive. In addition, the remote processing service may time-stamp the incoming frames and may further reformat and/or recompress them before archiving. At a later time, archived frames may be reviewed by the owner of the premises equipped with the monitoring device (or by another individual or entity). In one embodiment of the invention, the archived frames may be stored along with the classifications of foreground objects in the frames. A user may therefore be able to selectively review archived frames, for example, by requesting only frames that include certain types of objects (as defined by the classification). For example, the archived frames may be searched for frames that include foreground objects that are classified as "human" and that were recorded no longer than one month ago. The above example is not intended to limit the scope of the invention.

In Step 208, the remote processing service performs a classification of the foreground object(s) in the depth data frame. The classification may be performed separately for each foreground object in a single frame and/or for the foreground object track, i.e., the foreground object appearing in a set of subsequent frames. Alternatively, the classification may be performed based on an entire frame that includes one or more foreground objects. In one embodiment of the invention, the classification may identify a category to which the foreground object belongs. In one embodiment of the invention, the classification may be performed using a probabilistic framework. The classification may be performed based on a set of features, for example, the size and orientation of a bounding box of the foreground object, the shape of the foreground object, etc., obtained from the depth data of the foreground object. If the classification is performed for the track of the foreground object, additional features such as motion descriptors that include, but are not limited to, speed, trajectories and particular patterns (e.g. walking patterns) may be considered. Further, classifications may be accumulated over time to refine and improve accuracy and/or reliability of the classification. The features considered by the classification algorithm performing the classification may further include color information obtained from the video camera. The classification algorithm may be any algorithm capable of distinguishing classes of foreground objects (for example, humans, dogs, cats, etc.) with a minimum reliability and may include, but is not limited to, linear classifiers, support vector machines, quadratic classifiers, kernel estimators, boosting algorithms, decision trees, deep learning algorithms, and neural networks. Those skilled in the art will appreciate that the invention is not limited to the aforementioned classifiers and features used for classification. Any types of classifiers and features suitable for the classification of foreground objects may be employed.

In one embodiment of the invention, the classifier may have been pre-trained prior to activating the monitoring system. A dataset used for training the classifier may include, for example, depth data samples of foreground objects to be classified (for example, a number of humans, dogs, cats, etc.) with the correct class label attached. These depth data samples may have been recorded, for example, by other monitoring systems and may be assumed to be generic, i.e., not specific to a particular monitoring system monitoring a particular environment. The resulting classifier is a generic classifier, i.e., a classifier algorithm that a monitoring system may be pre-provisioned with, for example, by the manufacturer of the monitoring system, prior to shipping the monitoring system to the customer. Alternatively or in addition, the classifier may have been trained using locally obtained depth data samples, e.g. data that are specific to the monitored environment, thereby potentially (a) improving the classification accuracy and the robustness of the generic classifier, and (b) adding new classes of objects that are specific to the monitored environment. This camera-specific classifier may be combined with the generic classifier, or it may be maintained as a separate classifier.

In one embodiment of the invention, the camera-specific classifier is updated after a classification has been completed if there are frames in the foreground object track where the foreground object has not been successfully classified. In such a scenario, the foreground object, in frames where the classification has been unsuccessful, may be labeled based on the foreground object track classification, i.e., the foreground object in each individual frame of the track may be labeled using the object track class label. The method used to add labels to individual frames of a foreground object track may be, for example, the previously described group induction. The newly classified frames may then be included in the training database for the camera-specific classifier. Additional depth data samples, recorded by the depth-sensing camera may be continuously or periodically used to re-train the local classification algorithm as further described below with reference to Step 218.

In one embodiment of the invention, an initial classification is performed for a foreground object in a single depth data frame. In one embodiment of the invention, a classification is obtained from multiple initial classifications performed for a set of subsequent depth data frames that include the same foreground object, (i.e. from the foreground object track). A track of the foreground object may include, for example, depth data frames provided by the depth-sensing camera over the last two seconds. Classification based on the track of the foreground object may enable the classifier to consider additional features, such as, for example, the speed of the foreground object, movement patterns, etc., and further may be more robust than the initial classification obtained for a single depth data frame. The foreground object track classification may be obtained, for example, by accumulating individual frame classifications (i.e., the initial classifications) and by performing the object track classification based on the accumulated classifications, using, for example, an augmented discrete Bayes filter.

In one embodiment of the invention, a simplified classification may be performed solely based on the detection of movement and the physical size of the moving foreground object. Consider a scenario where moving objects are classified as either small moving objects or large moving objects. In such a scenario a size threshold that separates small from large moving objects may be selected such that humans are reliably detected as large moving objects. Large moving objects may then automatically be considered a potential threat, whereas small moving objects may be considered harmless. This simplified classification may further be used as a backup classification method that the monitoring system may rely on, for example, when the internet connection between the camera system and the remote processing service fails. The simplified classification algorithm may then execute directly on the local computing device of the camera system, thus enabling continued monitoring. Even though it may not be possible to notify a remote operator or the owner during a network outage, local alarms, e.g. visual or audible alarm signals in the monitored environment may still signal the possible detection of an intruder, thus alarming the surrounding neighborhood. Alternatively, the amount of detected movement may be considered for threat detection. For example, a large object that moves significantly may be considered a threat, whereas a large object that moves locally only (e.g., a curtain blowing in the wind) may be considered harmless.

In Step 210, a determination is made about whether the foreground object was successfully classified in Step 208. In one embodiment of the invention, a high classification confidence is required in order to consider a classification successful, thus minimizing the risk of misclassifying a foreground object that is a threat as a different foreground object that does not indicate a threat. A classification may be considered unsuccessful if the classification is ambiguous (which may happen, for example, when the classification algorithm is required to distinguish between foreground objects with similar features, e.g., a dog and a similar-sized cat), or if the classification was not completed at all. A classification may not be completed, for example, if the monitoring system was set up recently and therefore primarily relies on the generic classifier which may not recognize foreground objects that are specific to the monitored environment. If a determination is made that the classification was successful, the method may proceed to Step 212.

In Step 212, a determination is made about whether the foreground object, classified by the classification algorithm in Step 210, or classified by a human operator in Step 216, is a threat. In one embodiment of the invention, a foreground object is considered a threat, depending on the class membership of the foreground object. For example, a dog or a cat may not be considered a threat, if the monitoring system has been configured to expect pets in the monitored environment, whereas a human entering the monitored environment may be considered a threat. In one embodiment of the invention, any foreground object that, in Step 208, was not positively identified as a harmless foreground object, is considered a threat. If a determination is made that the foreground object is not a threat, the method may return to Step 200 in order to repeat the above-described steps for the next depth data frame.

Returning to Step 212, if a determination is made that the foreground object is a threat, the method may proceed to Step 214. In Step 214, threat-mitigating actions may be taken. In one embodiment of the invention, a human operator may be asked to manually review the detected threat. The human operator may receive, for example, the video affiliated with the foreground object identified to be a threat. If the human operator confirms the threat, the owner of the monitored premises may receive a notification via her portable device, e.g. her cell phone or tablet. The notification may include a video clip of the activity recorded while the threat was detected based on the depth data. The owner may then acknowledge receipt of the notification and may decide whether further action is necessary. The owner may, for example, push one button to discard the notification as a false alarm, or she may push another button to automatically notify the police. If the owner chooses to notify the police, the remote processing service may automatically forward all available information, including the video clip, to the police. Subsequently, the method may return to Step 202 in order to repeat the above-described steps for the next frame of depth data.

Returning to Step 210, if a determination is made that the classification performed in Step 208 was unsuccessful, the method may proceed to Step 216. In Step 216, the remote processing service requests a human operator to classify the foreground object.

In one embodiment of the invention, the human operator, asked to classify the foreground object, may receive a sequence of frames showing the foreground object that could not be classified in Step 208. In one embodiment of the invention, the frames provided to the human operator include the sequence of color image frames corresponding to the depth data frames of the unclassified foreground object (i.e., the video stream). The foreground requiring manual classification by the human operator may be highlighted in the video.

In one embodiment of the invention, the human operator may apply a single class label to the track of the foreground object. Using, for example, group induction, the remote processing service may then automatically label all instances of the foreground object in all preceding and succeeding frames. The class label applied by the human operator may be an existing class label if the appropriate foreground object class already exists in the generic and/or camera-specific classifier. This may happen, for example, in a scenario where a small dog is not recognized as a dog, because the classifiers were only trained based on larger dogs. Alternatively, the class label may be a new class label, if an appropriate foreground object class does not yet exist. Consider, for example, a scenario where a window was left open, and wind blows a curtain around. The classifiers have not been previously trained to recognize curtain movement and therefore require manual classification by the human operator. After the foreground object classification, the human operator may further decide whether the manually classified object is a threat. In the examples discussed above, the human operator would indicate that the manually classified objects (the dog and the curtain) are not threats.

In one or more embodiments of the invention, a foreground object track where classification has failed may be forwarded to a single human operator, or they may be forwarded to a number of people that participate in a crowd-sourced identification of the unknown foreground object. Multiple participants may receive a video of the foreground object track to be classified on their smartphone. The video may be anonymized, for example by visualizing the depth edges or the surface normals rather than showing the color video, thereby allowing a participant to recognize potential threats vs non-threats without revealing much detail of the monitored environment. The participants may be rated and selected, for example, based on their reliability, including responsiveness and classification accuracy. If one of the participants does not respond with a classification within a predetermined amount of time, an alternative participant may be asked to classify the unknown object. In one embodiment of the invention, the majority vote of the group of participants is used for the classification of the unknown foreground object.

In Step 218, the remote processing service may update the classifier used in Step 208 based on the classification performed by the human operator in Step 216, thereby potentially improving future classification performance. A classifier may be updated by adding the foreground object track (or part of the foreground object track) and the corresponding classification, made by the human operator, to the dataset used for training the classifier. Subsequently the classification algorithm may be updated using the resulting new training dataset. The camera-specific classifier may be updated after the human operator has completed a foreground object classification, or it may be updated at scheduled times, i.e., foreground object tracks and the corresponding classifications made by a human operator are accumulated over time before updating the classifier. In one embodiment of the invention, foreground object tracks and their corresponding classifications may only be added to the training dataset if the same foreground object has been repeatedly observed, thereby reducing the likeliness of adding insignificant foreground object tracks that were one-time events only. In order to further improve the classification accuracy of the classification algorithm, negative training samples, i.e., non-foreground object tracks that are labeled accordingly, recorded from either the monitored environment, or from a different environment, may be added to the training dataset before the algorithm is updated. In one embodiment of the invention, the generic classifier may be updated only by an administrator of the monitoring system. The administrator may, for example, only select foreground object tracks of highest relevance with general validity, i.e. foreground objects that are not specific to the monitored environment, and may therefore be observed in other monitored environments as well.

Subsequently, the method may proceed to Step 212, where a determination is made about whether the foreground object, manually classified in Step 218, is a threat. If the foreground object is not a threat, no further action is taken, and the method may return to Step 200 in order to process the next frame. If, however, the foreground object is a threat, threat mitigating actions may be taken in Step 214, as previously described.

Figure 3:
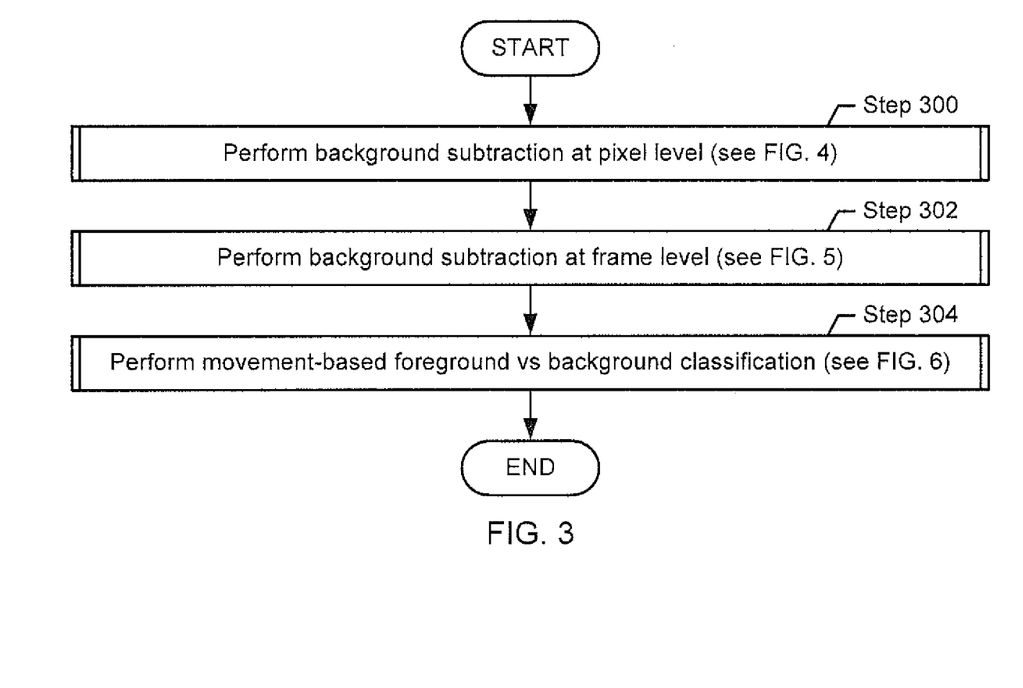
FIG. 3 shows a flowchart in accordance with one or more embodiments of the invention.

FIG. 3 shows a method for performing a background subtraction in a depth data frame, i.e., the identification and isolation of foreground objects, the classification of non-foreground object related image data as background, and subsequent elimination of the background from the frame of depth data received in Step 202.

Turning to FIG. 3, in Step 300, the background subtraction is performed at pixel level, i.e., each pixel is separately classified as either foreground or background. The details of Step 300 are described in FIG. 4.

In Step 302, the background subtraction is performed at frame level, i.e., based on the classification of individual pixels as foreground or background, a cohesive foreground object or multiple cohesive foreground objects is/are identified in the depth data frame. The details of Step 302 are described in FIG. 5.

In Step 304, a movement-based foreground vs background classification is performed. Foreground objects that are stationary for a minimum duration may be reclassified as background. The method may be performed separately for each foreground object in a depth data frame if multiple foreground objects exist in the frame. The details of Step 304 are described in FIG. 6.

Figure 4:
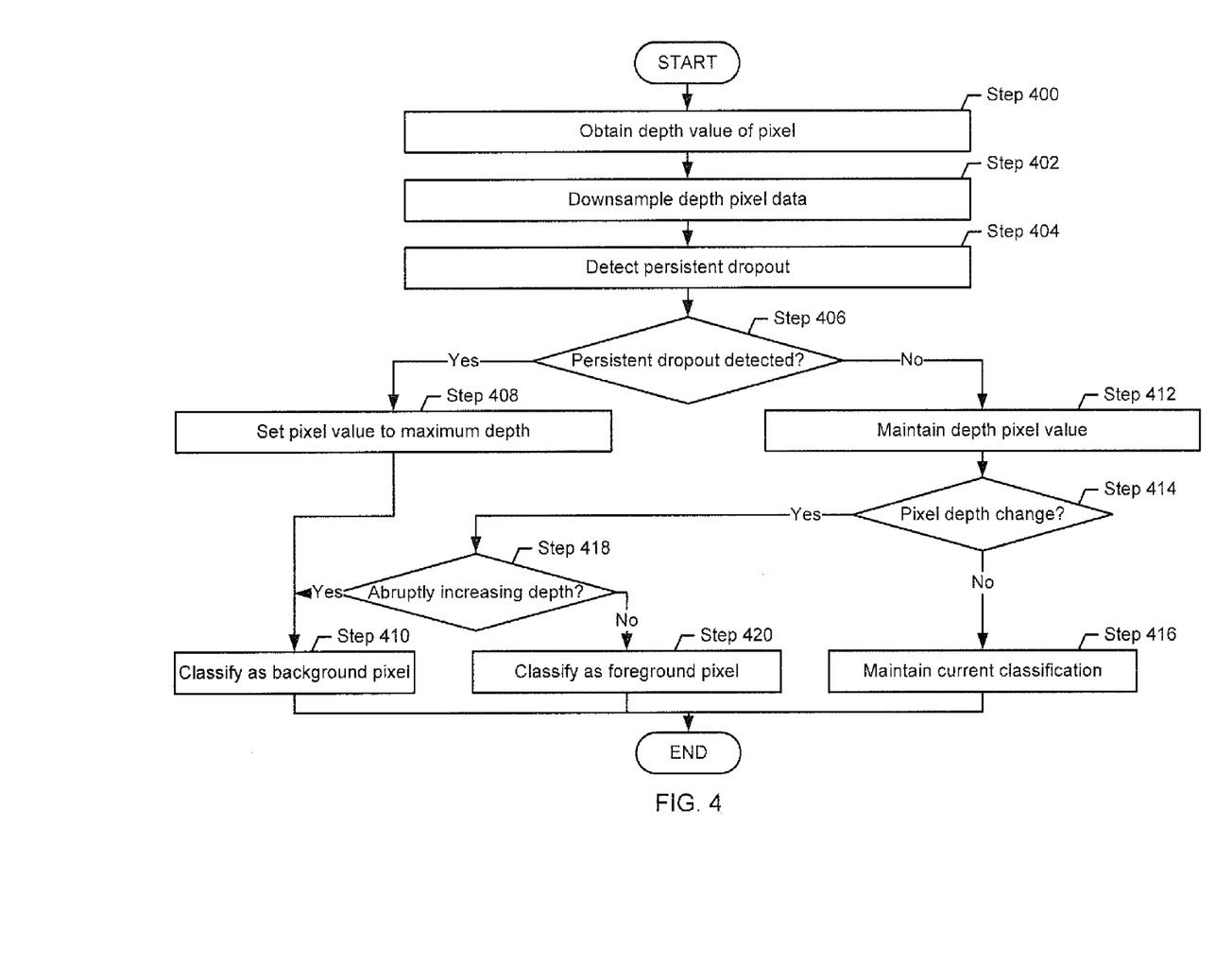
FIG. 4 shows a flowchart in accordance with one or more embodiments of the invention.

FIG. 4 shows a method for performing a background subtraction based on the depth location of an individual pixel. The method described in FIG. 4 is performed on a per-frame basis, separately for each depth pixel of a frame provided by the depth-sensing camera. In one embodiment of the invention, after completion of the method described in FIG. 4, all pixels of the frame being processed are classified as either "background" or "foreground." During the initial execution of the method of FIG. 4, all pixels are classified as "background," regardless of their depth values.

Turning to FIG. 4, in Step 400, a depth value is obtained for a pixel of the current frame received from the depth-sensing camera. Step 400 may be performed separately for each pixel of the frame. In one embodiment of the invention, the depth value is the depth value of the pixel received from the depth-sensing camera. Alternatively, the depth value may be computed as an average over time from multiple subsequent depth values provided by the depth-sensing camera, thereby smoothing the depth value, or it may be estimated under consideration of camera specific errors, depth values of adjacent pixels, etc.

In Step 402, the depth pixel data, provided in a single frame by the depth-sensing camera in Step 202, may be downsampled. In one embodiment of the invention, the depth pixel data is downsampled in order to reduce the computational load resulting from executing the method described in FIG. 4. For example, in case of processing a complete frame of 320× 240 depth data pixels at 30 fps, the method described in FIG. 4 would need to be executed 2,304,000 times during a 1 second time interval. In one embodiment of the invention, the frame is downsampled by a factor 12, resulting in a downsampled frame of 80×80 pixels. Accordingly, the method described in FIG. 4 may only need to be executed 192,000 times during the same 1 second time interval. In one embodiment of the invention, subsequent Steps 402-420 of the method described in FIG. 4 are performed separately for each pixel of the downsampled frame. Alternatively, Steps 402-420 may be performed on the original depth data frame, i.e. without downsampling.

In Step 404, the pixel is analyzed for persistent depth dropout. In one embodiment of the invention, persistent depth dropout is an unreliable depth measurement over a prolonged time. For example, depth dropout may be detected if a pixel value provides unreliable depth data for over 10 seconds. Unreliable depth values may be, for example, noisy depth values reported for the pixel and/or pixel values that saturate at the minimum or maximum depth. Unreliable depth values may be detected probabilistically, when a confidence threshold is exceeded over a period of time. Reasons for persistent depth dropout include, but are not limited to, the tracked object being too far or too close from/to the camera, i.e., outside of the camera's operating range, certain surface materials with particular reflective characteristics, e.g. glass, and the tracked surface of an object being at a steep oblique angle. Further, the reasons for persistent depth dropout may be specific to the measurement principle of the depth-sensing camera.

In Step 406, a determination is made about whether the depth value of the pixel is affected by persistent depth dropout. If the pixel is affected by persistent depth dropout, the method may continue to Step 408.

In Step 408, the pixel value is set to a maximum depth. In one embodiment of the invention, the maximum depth is a depth value known to be background. The depth may be set to, for example, the depth of a background detected during previous execution cycles of the method. Alternatively, the depth may be set to the maximum depth the depth-sensing camera is capable of reporting. In Step 410, the pixel is classified as a background pixel.

Returning to Step 406, if a determination is made that the depth value of the pixel is not affected by persistent dropout, the method may proceed to step 412. In Step 412, the pixel value obtained in Step 402 is maintained.

In Step 414, a determination is made about whether the pixel value has changed in comparison to values reported for the same pixel during earlier execution cycles. In one embodiment of the invention, a threshold may be employed to detect movement toward or away from the depth-sensing camera. If, for example, an absolute distance between the current depth location of the pixel and a previous depth location of the pixel is above the threshold, movement may be detected. The previous depth location of the pixel may be, for example, the depth location of the pixel during the previous execution cycle of the method of FIG. 2, or it may be obtained from a series of depth locations obtained from multiple previous execution cycles, e.g., by calculating a moving average. If a determination is made that the pixel value has not changed, the method may proceed to Step 416.

In Step 416, the previous classification of the pixel is maintained, i.e., if the pixel was classified as background, the pixel may remain a background pixel, and if the pixel was classified as foreground, the pixel may remain a foreground pixel.

Returning to Step 414, if a determination is made that the pixel value has changed, the method may proceed to Step 418. In Step 418, a determination is made about whether the depth value of the pixel is abruptly increasing. The detection of abrupt increases in distance may be used to detect whether an object that has previously occupied the pixel's space has moved out of the pixel's space, thereby causing the pixel to assume a depth value based on an object or background behind the object that previously occupied the space. In one embodiment of the invention, abruptly increasing depth may be detected if the distance between the currently reported depth location and a previously reported depth location exceeds a threshold value. The threshold may be set sufficiently high to ensure that rapidly backward moving objects do not trigger the detection of an abruptly increasing depth. If a determination is made that the depth of a pixel has abruptly increased, the method may proceed to Step 410.

In Step 410, the pixel is classified as a background pixel. Even though the new depth of the pixel may be caused by either an actual background, or another object that is not background, the method assigns the pixel to "background" in either case. However, subsequent execution of the method described in FIG. 4 for the next frame received from the depth-sensing camera may allow discrimination between the pixel being background or a new foreground, as follows: If in the next frame, the pixel depth value remains stationary, the pixel may be a background pixel. If, however, movement is detected, the pixel is reassigned to foreground, as further described below with reference to Step 420.

Returning to Step 418, if a determination is made that the depth is not abruptly increasing, the method may proceed to Step 420. In Step 420, the pixel is classified as foreground. In one embodiment of the invention, a pixel is therefore classified as foreground if any kind of pixel depth change, with the exception of an abrupt increase of pixel depth, is detected. A change in pixel depth may be triggered by an object moving in the monitored environment. Because a background is assumed not to move, a pixel with a changing depth value necessarily cannot be background, and is therefore assigned to foreground.

Figure 5:
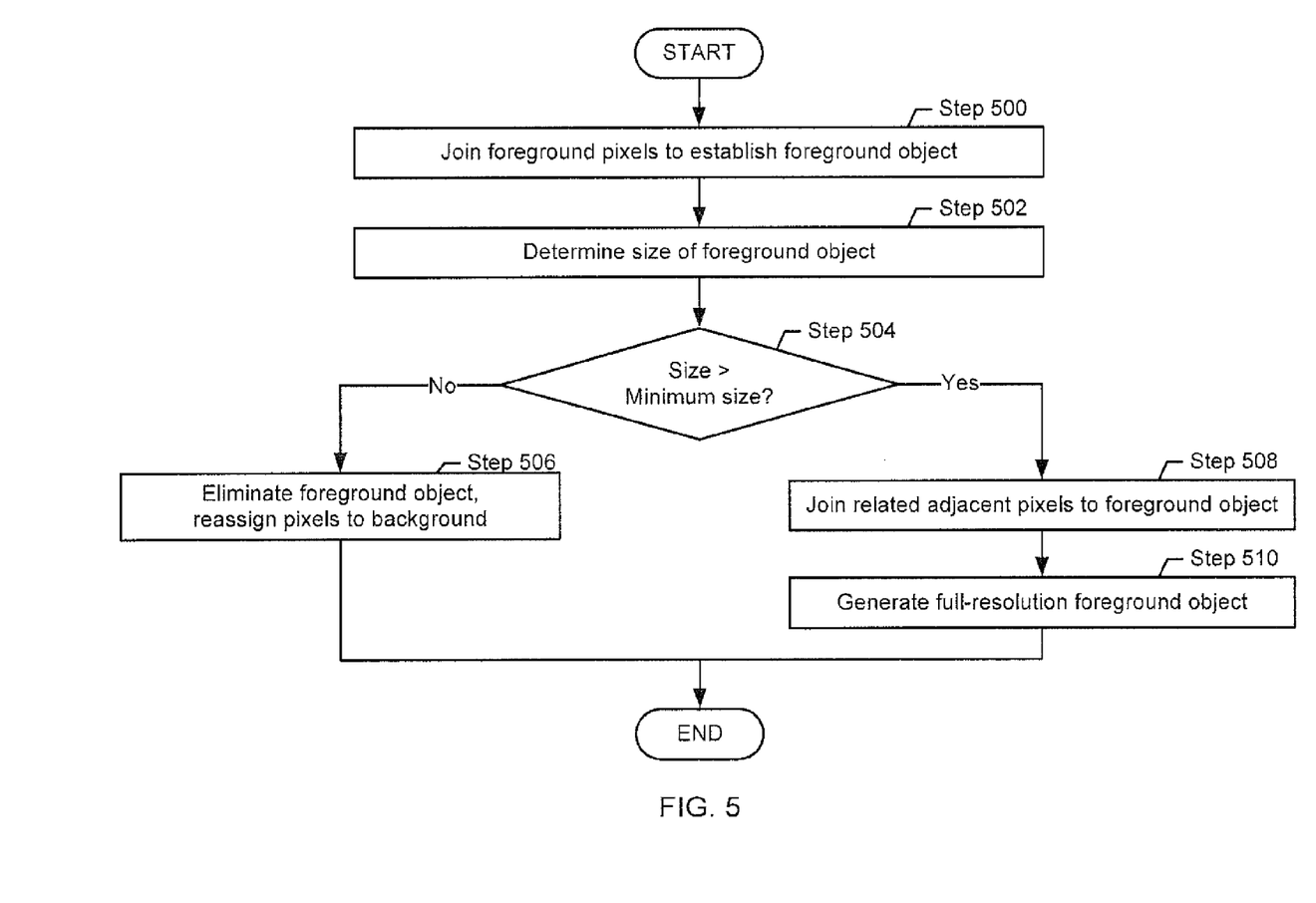
FIG. 5 shows a flowchart in accordance with one or more embodiments of the invention.

FIG. 5 shows a method for performing a background subtraction at single-frame level. Based on the classification of individual pixels as foreground or background performed by the method described in FIG. 4, a cohesive foreground object or multiple cohesive foreground objects may be identified.

Turning to FIG. 5, in Step 500, foreground pixels are joined to establish a foreground object. In one embodiment of the invention, adjacent foreground pixels with similar depth values, i.e., pixels that may form a surface of an object, are assigned to a foreground object. In one embodiment of the invention, small defects in the foreground object are corrected. For example, a background pixel or a small group of background pixels, surrounded by foreground pixels belonging to a foreground object, may be assigned to the foreground object. In one embodiment of the invention, Step 500 may be repeated if multiple separate clusters of foreground pixels exist in the frame, thereby establishing or maintaining multiple separate foreground objects.

In Step 502, the geometric extent of the foreground object(s) is determined. The geometric extent of a foreground may be determined, for example, by counting, in a 2D plane perpendicular to the view of the camera, the number of pixels occupied by the foreground object. Further, if the size of a pixel is known, a surface area may be calculated based on the number of counted pixels. Alternatively, a bounding box around the set of 3D points that define the foreground object may be determined, and subsequently the volume of the bounding box may be calculated. Alternatively, based on an assumption that each 3D point of the foreground object is a sphere, cube or cuboid of a certain size (or of a size that scales with distance), the total volume of the foreground object may be obtained by adding up the volumes of the spheres, cubes or cuboids. The geometric extent of a foreground object may alternatively be obtained by computing a 2D mesh over the 3D points of the foreground object, and then by determining the surface area of the mesh. Those skilled in the art will appreciate that the invention is not limited to the aforementioned methods for determining the geometric extent of a foreground object.

In Step 504, a determination is made about whether the geometric extent of the foreground object established in Step 500 is larger than a specified minimum geometric extent. The comparison may be performed for each foreground object defined in Step 500. If the geometric extent of the foreground object is smaller than the specified minimum geometric extent, the method may proceed to Step 506. In one embodiment of the invention, Step 504 may be repeated for each foreground object in the depth data frame.

In Step 506, the foreground object may be eliminated, and the pixels affiliated with the foreground object may be assigned to the background class. Objects with a surface area smaller than the minimum surface area may be artifacts or actual objects that are considered too small for being a potential threat, therefore not requiring the monitoring system's attention. The monitoring system may, for example, track humans and pets, including dogs and cats, but it may not be configured to track smaller animals, e.g., birds.

Returning to Step 504, if a determination is made that the size of the foreground object is larger than the specified minimum size, the method may proceed to Step 508. In Step 508, pixels related to the foreground object, established in Step 500, are joined to the foreground object. Related pixels may be pixels that, although belonging to a foreground object, are not necessarily detected as such by the method described in FIG. 4 because these related pixels may not have moved. Consider a scenario where a person in the monitored environment only moves a hand, but is otherwise immobile. Because the hand is moving, it is considered foreground (100% or very high foreground probability). However, because the torso of the person is not currently moving, but has moved in the past, it is considered foreground with a lower probability (see discussion of changing foreground vs background probabilities below, with reference to FIG. 6). Because the high-probability foreground pixels of the hand are locally connected to the lower-probability foreground pixels of the torso, the foreground probability of the torso pixels may be elevated to the foreground probability of the hand pixels, thus forming a single, coherent high-probability foreground object. In contrast, pixels that have a zero or near-zero foreground probability may not be joined to the foreground object, thus preventing the inadvertent addition of background (e.g., a nearby wall) to the foreground object. In Step 508, pixels in the vicinity of the foreground pixels representing the moving hand are assigned to the foreground object, thus causing the arm and subsequently the torso of the person to become part of the foreground object, until the entire person is a foreground object. Subsequently, the cluster of pixels forming the foreground object may be maintained, even if only a subset of the pixel indicates movement, thereby avoiding that stationary elements of the foreground object are reassigned to background. In one embodiment of the invention, a flood fill algorithm is used to join related pixels to the foreground object. Step 508 may be repeated for each foreground object in the depth data frame.

In Step 510, the full-resolution foreground object is generated. In one embodiment of the invention, the foreground vs background pixel classification and the identification of foreground objects may have been performed based on downsampled depth pixel data. In one embodiment of the invention, in Step 510, the foreground objects identified from the downsampled depth pixel data are restored to the resolution of the non-downsampled depth data provided by the depth-sensing camera. Pixels that were eliminated by the downsampling performed in Step 400 (and which therefore have not be classified as either foreground or background) may be joined to foreground objects, based on proximity to adjacent pixels that were included in the downsampled depth data frame, and based on the depth value of the pixel. Consider, for example, a pixel that was not included in the downsampled depth data frame and that is immediately adjacent to a foreground pixel that was included in the downsampled depth data frame. Further assume that both pixels have similar depth values. The pixel that was eliminated by the downsampling would therefore be joined to the foreground object to which the downsampled foreground pixel belongs. In contrast, consider a pixel that has a depth value that is consistent with the background, and that is located between a downsampled foreground pixel and a downsampled background pixel. Because the depth value of the pixel indicates that the pixel is background, the pixel would not be assigned to the foreground object. In one embodiment of the invention, an edge preserving smoothing filter, e.g., a bilateral filter, is used to establish the border between pixels that are background and pixels that are foreground. Pixels that are determined to be foreground, based on the filter, may be joined to the foreground object, whereas pixels that are determined to be background, based on the filter, may be assigned to the background.

Figure 6:
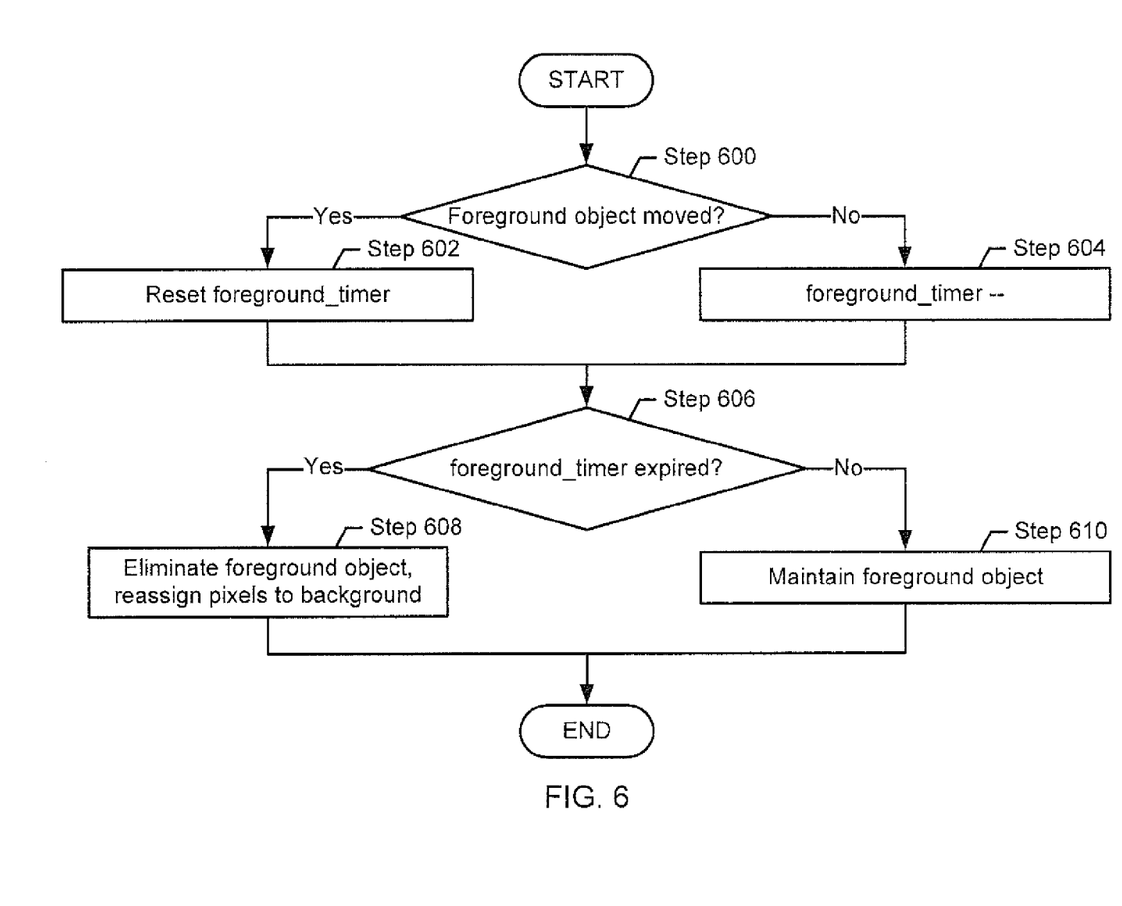
FIG. 6 shows a flowchart in accordance with one or more embodiments of the invention.

FIG. 6 shows a method for performing a movement-based foreground vs background classification. Foreground objects that are stationary for a minimum duration may be reclassified as background, based on the rationale that permanently stationary objects are not threats and therefore do not require monitoring. More specifically, the foreground vs background determination may be performed in a probabilistic manner. For example, an object that is currently moving may be assigned a 100% foreground probability. As an object remains stationary, the probability of the object being a foreground object may gradually decrease. The method described in FIG. 6 may rely on a timer, foreground_timer to track the duration an object has been stationary. In one embodiment of the invention, the timer may be a downward-counting timer that is initialized to a configurable time interval that defines the duration after which a foreground object may be considered stationary (i.e., with a 0% probability of being a foreground object) and may therefore be eliminated. The method described in FIG. 6 may be performed separately for each foreground object, and each timer used to track the duration of object stationarity may be independent from other timers tracking the duration of stationarity of other objects.

Turning to FIG. 6, in Step 600, a determination is made about whether the foreground object has moved. In one embodiment of the invention, movement is detected if a minimum number of pixels representing a foreground object are changing between "foreground" and "background" and/or vice-versa, between the current depth data frame and the previous depth data frame or a series of previous depth data frames. In one embodiment of the invention, a threshold requiring a minimum number of pixels to change between foreground and background is employed to detect movement of the object. The threshold may be set such that noisy depth measurements do not falsely indicate movement. If a determination is made that the foreground object has moved, the method may proceed to Step 602. In Step 602, the timer is reset to its initial value. If a determination is made that the foreground object did not move, the method may proceed to Step 604.

In Step 604, the timer is decremented. The timer may be decremented by an amount of time that is based on the execution frequency of the method. For example, if the method is executed once per frame received from the depth-sensing camera, and assuming that the camera provides 30 frames per second, the timer is decremented by approximately 33 ms.

In Step 606, a determination is made about whether the timer has expired. The determination may be made separately for each timer affiliated with an object. If a determination is made that the timer has expired, the method may proceed to Step 608. In Step 608, the foreground object is eliminated, and the pixels of the eliminated foreground object may be reassigned to the background class.

Returning to Step 606, if a determination is made that the timer has not expired, the method may proceed to Step 610, where the foreground object may be maintained, i.e., where the foreground object is not eliminated.

In one embodiment of the invention, the previously described methods shown in FIGS. 2-6 may be executed without the background subtraction. More specifically, a raw 2D representation including non-separated foreground and background may be provided to the remote processing service by the local computing device. The remote processing service may then identify foreground objects based on the raw 2D representation received from the local computing device prior to classifying the foreground objects.

Embodiments of the invention may enable a monitoring system to efficiently and reliably identify threats and to distinguish threatening events from non-threatening events. Rather than issuing an alert for any detected activity in the monitored environment, the monitoring system may classify detected objects, and based on the classification may decide whether an object is a threat, thereby reducing the number of false alarms. Embodiments of the invention may only require intervention by a human operator in cases where a classification is unsuccessful, thus reducing the operating cost. Further, if human intervention is necessary, classification may subsequently improve, based on the manually performed classification by the human operator. In addition, a monitoring system in accordance with one or more embodiments of the invention may be set up by a user without technical background. The monitoring system may also be remotely updated, for example, when improved classification algorithms become available, thereby obviating the need for third party professional setup and maintenance. Embodiments of the invention rely on a background subtraction that may eliminate non-relevant background data, thereby facilitating the classification task and improving classification performance, and further, reducing the amount of data transmitted from the local camera system to a processor performing the classification.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for securing an environment, comprising:
    obtaining a two-dimensional (2D) representation of a three-dimensional (3D) environment, wherein the 2D representation comprises a 2D frame of pixels encoding depth values of the 3D environment;
    detecting, probabilistically, a pixel in the 2D frame that is affected by persistent depth dropout, wherein the pixel is affected by persistent depth dropout when the pixel is associated with unreliable depth values, wherein depth values associated with the pixel are unreliable when a confidence threshold for depth values associated with the pixel is exceeded over a period of time; and
    assigning the pixel affected by the persistent depth dropout to a background of the 2D representation;
    identifying a plurality of foreground pixels in the 2D representation;
    defining a foreground object based on the plurality foreground pixels;
    assigning pixels of the 2D representation that are not associated with the foreground object and that are not already associated with the background to the background;
    eliminating the background from the 2D representation to obtain an updated 2D representation; and
    sending the updated 2D representation to a remote processing service.

2. The method of claim 1, wherein identifying the plurality of foreground pixels comprises:
    detecting pixels where the depth value changes between a prior 2D frame and the 2D frame; and identifying the plurality of foreground pixels, by selecting, from the detected pixels, pixels where the depth values do not abruptly increase.

3. The method of claim 1, wherein defining the foreground object comprises:
identifying a cluster of coherent foreground pixels in the plurality of foreground pixels;
determining that the cluster of coherent foreground pixels has at least a minimum geometric extent;
identifying related pixels in the vicinity of the cluster of coherent foreground pixels, wherein the related pixels have depth values substantially similar to depth values associated with at least one of the cluster of coherent foreground pixels; and
combining the cluster of coherent foreground pixels and the related pixels to obtain the foreground object.

4. The method of claim 3, wherein identifying related pixels is performed using a bilateral filter.

5. The method of claim 1, further comprising:
making a determination that the foreground object has not moved for at least a specified duration; and
based on the determination, assigning the foreground object pixels of the foreground object to the background.

6. The method of claim 1, further comprising:
obtaining a two-dimensional (2D) color video representation of the three-dimensional (3D) environment; and
sending the 2D color video representation to the remote processing service.

7. The method of claim 1, further comprising:
obtaining an acceleration sensor measurement from an acceleration sensor attached to a camera used to obtain the 2D representation of the 3D environment; and
detecting camera orientation and camera movement from the acceleration sensor measurement.

8. A non-transitory computer readable medium comprising instructions, that enable a system to
obtain a two-dimensional (2D) representation of a three-dimensional (3D) environment, wherein the 2D representation comprises a 2D frame of pixels encoding depth values of the 3D environment;
identify a plurality of foreground pixels in the 2D representation;
detect, probabilistically, a pixel in the 2D frame that is affected by persistent depth dropout, wherein the pixel is affected by persistent depth dropout when the pixel is associated with unreliable depth values, wherein depth values associated with the pixel are unreliable when a confidence threshold for depth values associated with the pixel is exceeded over a period of time; and
assign the pixel affected by the persistent depth dropout to a background of the 2D representation;
define a foreground object based on the plurality foreground pixels;
assign pixels of the 2D representation that are not associated with the foreground object and that are not already associated with the background to the background;
eliminate the background from the 2D representation to obtain an updated 2D representation; and
send the updated 2D representation to a remote processing service.

9. The non-transitory computer readable medium of claim 8, further comprising instructions, that enable the system to:
detect pixels where the depth value changes between a prior 2D frame and the 2D frame; and
identify the plurality of foreground pixels, by selecting, from the detected pixels, pixels where the depth values do not abruptly increase.

10. The non-transitory computer readable medium of claim 8, wherein the instructions that enable the system to define the foreground object comprises instructions to:
identify a cluster of coherent foreground pixels in the plurality of foreground pixels;
determine that the cluster of coherent foreground pixels has at least a minimum geometric extent;
identify related pixels in the vicinity of the cluster of coherent foreground pixels, wherein the related pixels have depth values substantially similar to depth values associated with at least one of the cluster of coherent foreground pixels; and
combine the cluster of coherent foreground pixels and the related pixels to obtain the foreground object.

11. The non-transitory computer readable medium of claim 10, wherein the instructions that enable the system to identify related pixels comprise a bilateral filter.

12. The non-transitory computer readable medium of claim 8, further comprising instructions, that enable the system to:
make a determination that the foreground object has not moved for at least a specified duration; and
based on the determination, assign the foreground object pixels of the foreground object to the background.

* * * * *